United States Patent

Tatkar et al.

[11] Patent Number: 6,119,206
[45] Date of Patent: Sep. 12, 2000

[54] DESIGN OF TAGS FOR LOOKUP OF NON-VOLATILE REGISTERS

[75] Inventors: Vijay K. Tatkar, Cupertino; Bruce A. Delagi, Palo Alto; Terrence C. Miller, Menlo Park; Joel Steven Zucker, Manhattan Beach, all of Calif.

[73] Assignee: Sun Microsystems, Inc., Palo Alto, Calif.

[21] Appl. No.: 08/680,575

[22] Filed: Jul. 12, 1996

Related U.S. Application Data

[60] Provisional application No. 60/011,522, Feb. 12, 1996, abandoned.

[51] Int. Cl.$^7$ .................................................. G06F 12/06
[52] U.S. Cl. ..................... 711/147; 711/147; 711/165; 711/170; 711/203; 711/209; 702/101; 395/672; 395/674; 395/200.43; 395/200.45
[58] Field of Search ..................... 395/200.3, 200.31, 395/200.32, 200.34, 200.35, 200.43, 200.45, 672, 674; 711/147, 165, 202, 203, 209, 170; 767/2; 702/101

[56] References Cited

U.S. PATENT DOCUMENTS

| | | | |
|---|---|---|---|
| 4,297,743 | 10/1981 | Appell et al. | 364/200 |
| 4,493,027 | 1/1985 | Katz et al. | 364/200 |
| 5,189,733 | 2/1993 | Bennett et al. | 395/650 |
| 5,375,213 | 12/1994 | Arai | 395/400 |
| 5,535,390 | 7/1996 | Hildebrandt | 395/700 |
| 5,630,157 | 5/1997 | Dwyer, III | 395/800 |
| 5,765,006 | 1/1995 | Motoyama | 395/800 |
| 5,920,858 | 12/1995 | Kitabayashi et al. | 707/4 |
| 5,924,099 | 12/1994 | Guzak et al. | 707/100 |

FOREIGN PATENT DOCUMENTS

0690374A2  6/1995  European Pat. Off. .......... G06F 9/42

OTHER PUBLICATIONS

SunSoft slide, Post PowerPC EABI Working Group, 5 pages, Most accurate available copies for 5 viewgraphs distributed by Bruce Delagi at Power PC EABI working Group meeting in Santa Cruz, CA in Jun., 1995.

*Primary Examiner*—John W. Cabeca
*Assistant Examiner*—David Ransom
*Attorney, Agent, or Firm*—Townsend & Townsend & Crew LLP

[57] ABSTRACT

Stack tracebacks are performed in debugging and exception handling routines, and involve providing the values of non-volatile registers at the time of entry into each function in a call chain. One stack traceback technique includes performing the following two steps for each virtual address at which a function call in the call chain is made: (1) locating the tag section whose virtual address range includes the virtual address; and (2) locating a tag in the tag section found in step (1), whose virtual address range includes the virtual address. The tag found in step (2) indicates which of the values, if any, respectively held by the non-volatile registers upon entry to the particular function in which the above function call is made, are stored in a stack frame for the particular function at the time of the function call.

23 Claims, 7 Drawing Sheets

DESIGN OF TAGS FOR LOOKUP OF NON-VOLATILE REGISTERS

STATEMENT OF RELATED APPLICATIONS

This application claims priority of U.S. Provisional Application Ser. No. 60/011,522, filed Feb. 12, 1996, now abandoned and hereby incorporates by reference this Provisional Application for all purposes.

BACKGROUND OF THE INVENTION

The present invention relates to computer software, and, more particularly, to stack tracebacks which provide the values held by one or more registers upon entry to each function in a call chain.

In order to reduce the frequency of relatively time-consuming accesses to main memory, compilers and programmers typically generate code using registers of a target processor for the storage of some or all function local variables. However, each function may call another function which, in turn, may modify the contents of one or more of the registers used for storing local variables of the calling function. Several solutions are possible for ensuring that the correct values of the calling function's local variables, as held in one or more registers, are preserved upon resumption of execution in the calling function after a return from the called function:

1) Before a function calls another function, the calling function could save, to main memory, the values of all registers currently storing local variables of the calling function. After the return from the called function, the calling function would restore the saved values into the registers. Typically, a region of reserved memory, known as a runtime stack, is used for storing the above register values. Before performing the above saving, a function allocates an area at the top of the runtime stack, sometimes referred to as a frame. A frame provides storage for various types of information pertaining to a particular invocation of a function. Each frame is deallocated from (popped off) the stack before returning from the function that created the frame.

The advantage of the above solution is that values of all local variables are self-contained in the frame of current invocation. Thus, external, runtime probes such as debuggers or exception handlers can easily find them. However, this solution is somewhat inefficient with respect to computation time and memory requirements because frequently a called function will not modify one or more of the registers that the calling function is using (and, thus, saving these registers in memory is unnecessary). Efficiency is a particular concern with modern processors having a large number of registers that could be used for local variable storage.

2) By convention, certain registers could be designated "non-volatile." It would be the responsibility of a called function to save, to a frame for the called function in the runtime stack, the value held by a non-volatile register upon entry to the called function if and before the called function modifies the register. The called function would also be responsible for restoring the value saved on the stack to the register before returning to the calling function.

The second solution is the approach taken by the System V Application Binary Interface (ABI) for the PowerPC. The specification for this interface is published by Sun Microsystems, Inc. of Mountain View, Calif. and, hereby, incorporated by reference for all purposes. This ABI specifies various conventions to ensure that any function compiled to run under the System V operating system on the PowerPC processor, can correctly interface with any other such function. One of the conventions specified by this ABI is that integer registers r14–r31 and floating-point registers f14–f31 are non-volatile.

In various contexts such as debugging and exception handling, it may be necessary to determine the value held by a particular non-volatile register upon entry to a particular function in a call chain. A call chain is a sequence of nested function calls occurring during program execution. For example, if a program's main routine calls function A and function A calls function B, then the call chain existing during execution within function B consists of: the main routine, followed by function A, followed by function B. Typically, the runtime stack has one frame for each invocation of each function in the current call chain (except, possibly, for the last function called), which stores information pertaining to the function. Under special circumstances, an existing frame may be reused or extended instead of creating a new one.

In the above contexts, it would be necessary to determine whether the value held by the particular non-volatile register upon entry to the particular function is still in the register at the time execution reaches a particular address inside the particular function. The particular address is the address of the call from the particular function to the next function in the call chain, or in the case of the last function in the call chain, the address where execution of the program stops before the debugger or exception handling software takes over. If the required value is not in the register, the required value must be retrieved from the function's stack frame.

For example, debuggers typically permit a user to specify a breakpoint at an arbitrary location within any function. Upon reaching a breakpoint, such debuggers may examine the frames on the stack and provide the user with the current call chain. In addition, users can typically request the value of a particular local variable at the time of the call to a particular function in the call chain. Compiler-produced data, accessible to the debugger, indicates the particular non-volatile register in which the particular local variable is stored at the time of the particular function call. Thus, it becomes necessary to determine the value of the particular non-volatile register upon entry to the particular called function.

For example, suppose a breakpoint at line 10 in function func2 is specified and that the breakpoint is reached after a call to function func2 from line 20 of a function func1 which has a local variable a. Suppose the debugger examines the appropriate compiler-produced data to determine that local variable a at line 20 of func1 is stored in non-volatile register 15. However, the value of register 15 might have been changed inside func2 by the time the breakpoint at line 10 of func 2 was reached. Thus, the debugger must be able to determine the location, at the time the breakpoint in func2 is reached, of the value held by register 15 upon entry to func2. This location will either be register 15 or func2's stack frame.

Exception handling for some modern programming languages represents another context where it may be necessary to determine the contents of non-volatile registers upon entry to functions in a calling chain. For example, consider a C++ program containing a function func1 that catches a particular type of exception (i.e., using a "catch" statement) and calls another function func2 that generates that type of exception (i.e., using a "throw" statement). When the exception is generated in func2, execution returns to func1 where the exception handling code inside the catch statement is executed. Upon the return to func1, the non-volatile registers must be restored to their values at the time of the call to func2. For example, one or more of the non-volatile registers may have held pointers to memory that must be deallocated by the exception handling code within func1's catch statement. Thus, the exception handler must be able to determine the respective location, at the time the exception is generated in func2, of the value held by each non-volatile register upon entry to func2. This location will either be the register or func2's stack frame.

Debuggers and exception handlers are only instances of a more generic class of utilities which perform stack tracebacks. A standalone lightweight stack traceback utility is often found useful for past mortem analysis of failed executables. Another example is a standalone performance collector/analyzer which also requires call-chain information.

As illustrated by the above discussion, there is a need for a general capability to determine the location, at the time execution reaches any particular address in any particular function in a call chain, of the value held by any non-volatile register upon entry to the particular function. Compiler-produced records (herein referred to as "tags") that form part of the compiled code, have been used to provide the required information regarding the location of the values held by non-volatile registers upon function entry. For example, a tag might indicate that, when the value stored by the program counter (hereinafter "PC value") is within a particular virtual address range of the program, the values held in various non-volatile registers at the time of entry to the function associated with the virtual address range are stored in the function's stack frame, at specific locations.

Two basic types of tags have been proposed, in-line and out-of-line. An in-line tag is stored adjacent to the first instruction to which it applies. Out-of-line tags are stored as a group in a "tag section" of the compiled entity, apart from the compiled instructions to which they apply. Thus, each out-of-line tag must generally store information indicating the virtual address range to which the tag applies.

In-line tags generally require a field identifying themselves as tags (to the debugger or exception handler) as opposed to machine instructions (between which they are stored). Furthermore, the compiler must generate branch instructions to cause the processor to skip over the tags. In-line tags require debuggers or exception handlers to have a working knowledge of the underlying instruction set, in order to be decoded. Out-of-line tags are largely insensitive to these details. In-line tags are inserted into instruction stream and hence increase code size, affect caching behavior and require larger working sets. Out-of-line tags have none of these restrictions and can even be stripped from the executable, if desired. Self-relative tag references can also be shared among processes that map shared libraries. For these reasons, out-of-line tags are favored.

Several complications in using out-of-line tags (hereinafter referred to simply as "tags") are introduced in environments supporting shared objects. In such environments, a program executable may consist of a primary load object and one or more shared objects which are loaded dynamically into the program's virtual address space during execution. Each object has its own tag section containing tags that apply to the compiled instructions stored within the object. A mechanism is required to enable the debugger or exception handler to determine which tag section applies to any given virtual address (also referred to herein as a PC value) in the program.

In addition, a shared object may, by definition, be loaded into the address spaces of many different programs (or even into the address space of one program at different times during execution), at different virtual addresses. One way of implementing tags involves explicitly storing in the tags the respective virtual address ranges to which the tags apply. Such tags would have to be modified each time the shared object in which they reside is loaded at a different virtual address. Thus, it would be highly desirable to have a mechanism whereby the contents of the tags stored in a shared object could remain constant regardless of the virtual addresses of the instructions to which they apply.

SUMMARY OF THE INVENTION

A method of performing a stack traceback is provided by virtue of the present invention. Stack tracebacks are required in debugging and exception handling routines, and involve providing the values of non-volatile registers at the time of entry into each function in a call chain.

One embodiment contemplates performing a stack traceback for a program that includes a primary load object, and one or more shared objects (which are dynamically loaded into the program's address space during execution). Each of the objects contains a respective tag section having an associated address range to which the tag section applies. Each of the tag sections includes one or more tags. Each tag applies to a particular address range and indicates that, when program execution is within the tag's range, the values held by one or more of the non-volatile registers upon entry to the function occupying the range are stored in a stack frame for the function.

In the above embodiment, the disclosed stack traceback technique includes performing the following two steps for each address at which a function call in the call chain is made:

1) locating the tag section whose address range includes the address; and
2) locating a tag in the tag section found in (1), whose address range includes the address.

The tag found in the second step indicates which of the values, if any, respectively held by the non-volatile registers upon entry to the particular function in which the above function call is made, are stored in a stack frame for the particular function at the time of the function call.

More generally, the above technique can be adapted to the task of locating various types of information (other than information regarding non-volatile registers) that applies to a particular address in a program executing in an environment supporting shared objects. In particular, such a program could consist of a primary load object and one or more shared objects, where each of the objects includes a respective set of data that applies to a respective address range in the address space of the program. A technique for locating information applying to a particular program address includes the following steps:

locating a particular one of the sets of data, the address range to which the particular set of data applies including the particular program address; and searching the particular set of data to obtain the information applying to the particular program address.

Another aspect of the invention takes advantage of offset fields in the tags in order to permit the tags' contents to remain invariant regardless of the location in the program's address space at which the object containing the tags is loaded. For example, some tag types possess a base_offset field which usually stores the difference between the address at which the tag is stored and the first address to which the tag applies. Thus, the first address to which such a tag applies can be determined by adding the address at which the tag is stored to its base_offset field. Assuming a fixed distance between the tag and the first address to which it applies, the base_offset field remains constant regardless of the tag's location in the program's address space. By contrast, the value in a tag field explicitly storing an address to which the tag applies would have to be updated upon a change in the tag's location. The use of offset fields particularly facilitates the use of tags in shared objects, which may be loaded into the respective address spaces of different programs (or even into the address space of one program at different times during execution) at different addresses.

Another aspect of the invention involves a type of tag that can indicate that the values held in an arbitrary and not necessarily contiguous subset of the non-volatile registers upon function entry are stored in a stack frame when the program is executing in an address range to which the tag applies. Such a tag improves the program's computational efficiency by eliminating the need to save, in a stack frame, non-volatile registers that have not changed since function entry, merely in order to save a contiguous set of registers on the stack frame.

A further understanding of the nature and advantages of the inventions herein may be realized by reference to the remaining portions of the specification and the attached drawings.

DESCRIPTION OF THE PREFERRED EMBODIMENT

Figure 1:
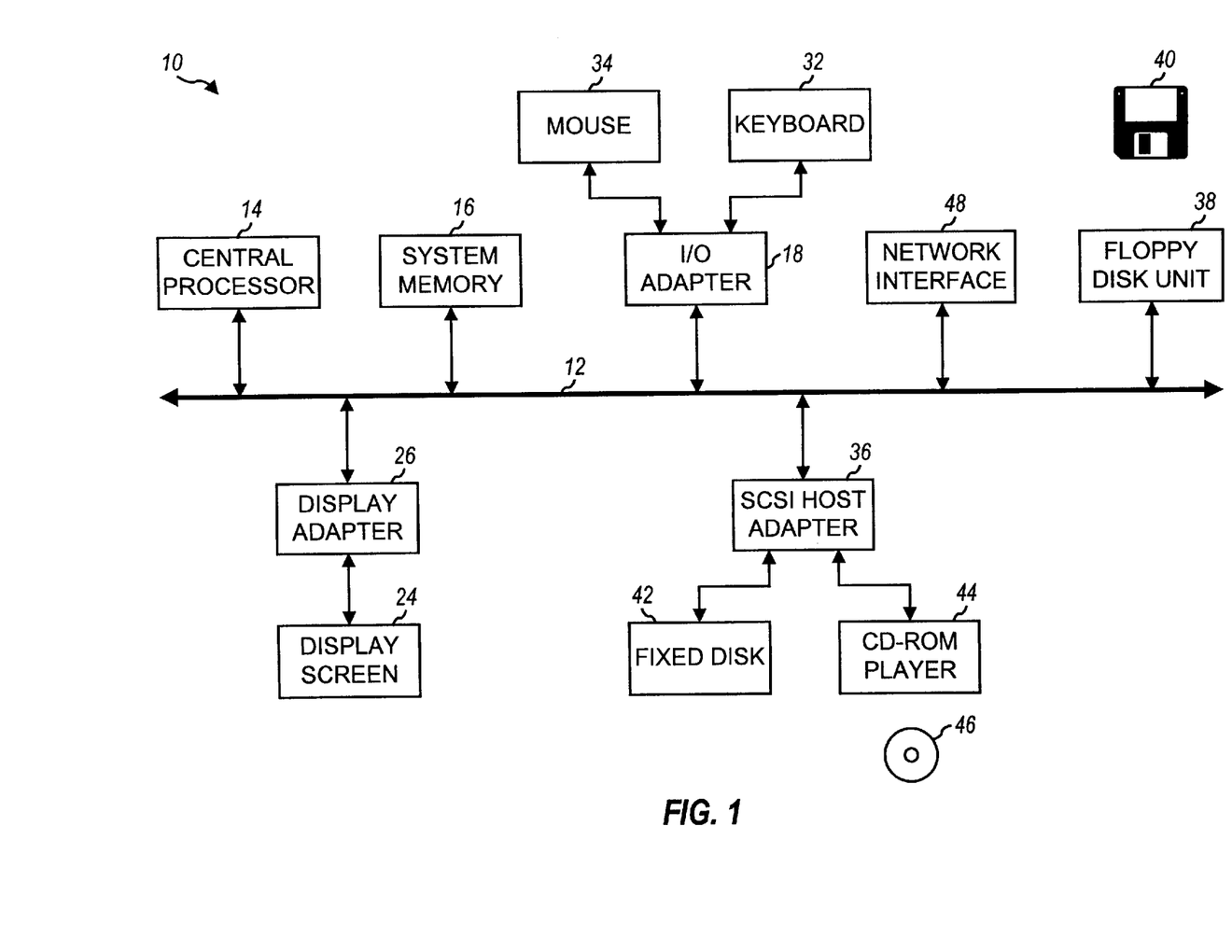
FIG. 1 depicts a block diagram of a computer system suitable for implementing the present invention.

FIG. 1 depicts a block diagram of a host computer system 10 suitable for implementing the present invention. Host computer system 10 includes a bus 12 which interconnects major subsystems such as a central processor 14, a system memory 16 (typically RAM), an input/output (I/O) adapter 18, an external device such as a display screen 24 via display adapter 26, a keyboard 32 and mouse 34 via I/O adapter 18, a SCSI host adapter 36, and a floppy disk drive 38 operative to receive a floppy disk 40. SCSI host adapter 36 may act as a storage interface to a fixed disk drive 42 or a CD-ROM player 44 operative to receive a CD-ROM 46. Fixed disk 42 may be a part of host computer system 10 or may be separate and accessed through other interface systems. A network interface 48 may provide a direct connection to a remote server via a telephone link or to the Internet via a POP (point of presence). Many other devices or subsystems (not shown) may be connected in a similar manner.

Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in this application. Code to implement the present invention may be operably disposed or stored in computer-readable storage media such as system memory 16, fixed disk 42, CD-ROM 46, or floppy disk 40.

A technique is disclosed herein for performing a stack traceback, i.e., for providing the values of non-volatile registers at the time of entry into each function in a call chain. For concreteness, the invention is described below as applied to program executables conforming to the conventions of the System V Application Binary Interface (ABI). However, the invention is equally applicable to any environment in which, by convention, certain registers are non-volatile.

Overview of System V ABI for the PowerPC Processor

The PowerPC Architecture provides 32 general purpose registers, each 32 bits wide. In addition, the architecture provides 32 floating-point registers, each 64 bits wide, and several special purpose registers. All of the general, special purpose, and floating-point registers are global to all functions in a running program. Brief register descriptions appear in the following table, followed by more detailed information about the registers.

| Register Name | Usage |
| --- | --- |
| r0 | Volatile register which may be modified during function linkage |
| r1 | Stack frame pointer, always valid |
| r2 | System-reserved register |
| r3–r4 | Volatile registers used for parameter passing and return values |
| r5–r10 | Volatile registers used for parameter passing |
| r11–r12 | Volatile registers which may be modified during function linkage |
| r13 | Small data area pointer register |
| r14–r30 | Registers used for local variables |
| r-31 | Used for local variables or "environment pointers" |
| f0 | Volatile register |
| f1 | Volatile register used for parameter passing and return values |
| f2–f8 | Volatile registers used for parameter passing |
| f9–f13 | Voiatile registers |
| f14–f31 | Registers used for local variables |
| CR0–CR7 | Condition Register Fields, each 4 bits wide |
| LR | Link Register |
| CTR | Count Register |
| XER | Fixed-Point Exception Register |
| EPSCR | Floating-Point Status and Control Register |

Registers r1, r14 through r31, and f14 through f31 are non-volatile; that is, they "belong" to the calling function. A called function shall save these registers' values before it changes them, restoring their values before it returns. Fields CR2, CR3, and CR4 of the condition register are non-volatile (value on entry must be preserved on exit); the rest are volatile (value in the field need not be preserved). The following registers have assigned roles in the standard calling sequence:

r1: The stack pointer (stored in r1) shall maintain 16-byte alignment. It shall always point to the lowest allocated, valid stack frame, and grow toward low addresses. The contents of the word at that address always point to (i.e. the word stores the address of) the previously allocated stack frame. If required, it can be decremented by the called function.

LR (Link Register): This register shall contain the address to which a called function normally returns. LR is volatile across function calls. In some embodiments, the link register does not contain an explicit return address but rather a quantity from which the return address can be computed.

The Stack Frame Format under System V ABI for PowerPC

Figure 2:
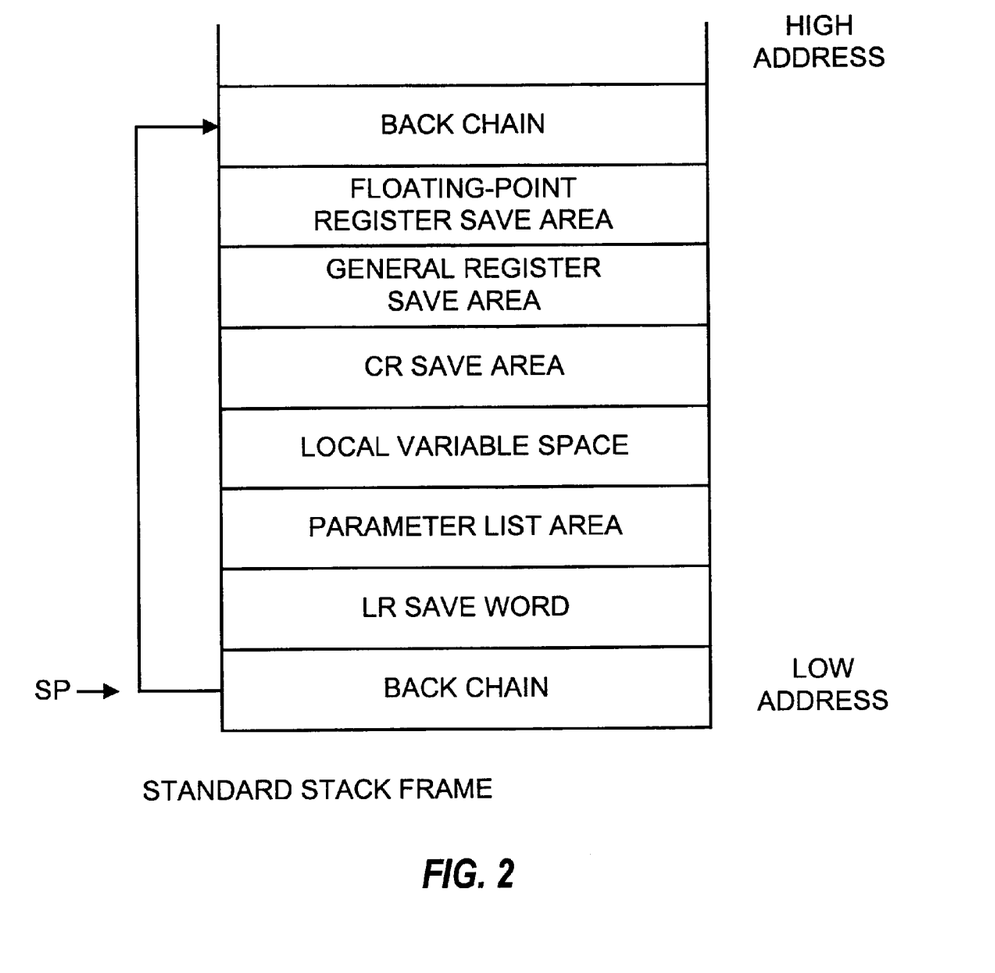
FIG. 2 depicts the contents of a stack frame as prescribed by the System V Application Binary Interface (ABI) for the PowerPC.

FIG. 2 shows the stack frame format under System V ABI for PowerPC. Each function in a call chain has a stack frame on the runtime stack, except possibly the last function to be called (see below). A function that does not create a new frame for itself, is called a "leaf" function. A non-leaf function can have leaf-like portions, i.e. sections of code in which a stack frame for the function h as not yet been established. The stack grows downward from high addresses. SP in FIG. 2 denotes the stack pointer, which is always held in general purpose register r1 and points to the "top" of the stack, i.e., to the frame for the last function in the call chain to have established a frame. The following requirements apply to the stack frame:

1) The stack pointer shall maintain 16-byte alignment.

2) The stack pointer shall contain th e address of the first word of the lowest allocated stack frame, the "back chain" word. The stack shall grow downward, that is, toward lower addresses. The first word of the stack frame shall always point to the previously allocated stack frame (toward higher addresses), except for the first stack frame, which shall have a back chain of 0 (NULL).

3) The stack pointer shall be decremented by a called function before the called function needs to establish a frame and restored prior to the return from the called function to its calling function.

4) The stack pointer shall be decremented and the back chain updated as one indivisible operation using one of the "Store Word with Update" instructions, so that the stack pointer always points to the beginning of a linked list of stack frames.

5) The parameter list area shall be allocated by the caller and shall be large enough to contain the arguments that the caller stores in it. Its contents are not preserved across calls.

6) The sizes of the floating-point and general register save areas may vary within a function and are determined by certain tag fields (as discussed further below). If the size of the floating-point (general) register save area is X double-words (words), then the save area provides storage for the values of the X highest numbered non-volatile floating-point (general) registers.

7) Before a function changes the value in any non-volatile floating-point register, frn (13<n<32), it shall save the value in frn in the double word in the floating-point register save area beginning 8*(32−n) bytes before the back chain word of the previous frame.

8) Before a function changes the value in any non-volatile general register, rn (13<n<32), it shall save the value in rn in the word in the general register save area 4*(32−n) bytes before the low-addressed end of the floating-point register save area. Thus, in order to save the value of a non-volatile general register onto a stack frame, the size of the frame's floating-point register save area must be known.

9) Before a function changes the value in any non-volatile field in the condition register, it shall save in the CR save area the values that were stored in all the non-volatile fields of the condition register at the time of entry to the function. Thus, in order to save the value of a non-volatile field of the condition register onto a stack frame, the respective sizes of the frame's floating-point and general register save areas must be known.

The stack frame header consists of the back chain word and the LR save word. The back chain word always contains a pointer to the previously allocated stack frame. Before a function calls another function, it shall save the contents of the link register at the time the function was entered in the LR save word of its caller's stack frame and shall establish its own stack frame.

Except for the stack frame header and any padding necessary to make the entire frame a multiple of 16 bytes in length, a function need not allocate space for the areas that it does not use. If a function does not call any other functions and does not require any of the other parts of the stack frame, it need not establish a stack frame. Any padding of the frame as a whole shall be within the local variable area; the parameter list area shall immediately follow the stack frame header, and the register save areas shall contain no padding.

A function generally restores non-volatile registers that were saved in the function's stack frame, restores the previous stack frame (i.e., deallocates its own stack frame by updating the stack pointer, SP, held in register 1) before returning to its caller.

Except for the rules below, the System V ABI for the PowerPC does not mandate predetermined code sequences for function prologues and epilogues. In particular, a function can save or restore values held by non-volatile registers upon function entry at any point during the function. However, the following rules, which permit reliable call chain backtracing, shall be followed:

1. Before a function calls any other function, it shall establish its own stack frame, whose size shall be a multiple of 16 bytes, and shall save the link register at the time of entry in the LR save word of its caller's frame.

2. If a function establishes a stack frame, it shall update the back chain word of the stack frame atomically with the stack pointer (r1) using one of the "Store Word with Update" instructions.

3. When a function deallocates its stack frame, it must do so atomically, either by loading the stack pointer (r1) with the value in the back chain field or by incrementing the stack pointer by the same amount by which it has been decremented.

Tag Formats Prescribed by System V ABI for PowerPC

As discussed in the Background section, tags facilitate determining the contents of non-volatile registers as they were when a function was entered. Given the virtual (i.e., program-specified) address (PC value) of the next instruction to be executed, and the tag, if any, applicable to that virtual address, a debugger or exception handler can determine the register contents upon function entry. Tags make it possible to determine which stack frame is associated with a section of code and, for any particular address in a function, which non-volatile registers (if any) have been saved in the floating-point and/or general register save areas of the stack frame associated with the function.

In the simplest case, a function that does not call another function needs no tag if it 1) does not establish its own frame and 2) does not disturb the contents of any of the non-volatile registers or the link register. Similarly, within a function, code that is leaf-like (in that it has not yet established a frame or has restored the stack, non-volatile registers, and the link register to their state on entry to the function) needs no tags.

Tables 1–5 define the four tag formats prescribed by the System V ABI for PowerPC. A function that establishes a frame requires at least one "Frame" or "Frame Valid" tag. Both of these formats specify the point in the code at which a frame is established and the sizes of the general and floating-point save areas. They may also specify a point at which a contiguous set of general and floating-point registers have been saved in the save area and a range of addresses from that point within which the frame and the saved registers remain valid. A function requires only a Frame or Frame Valid tag if it 1) establishes a frame, 2) saves all the non-volatile registers that it uses before changing any of them, and then 3) restores the registers and deallocates the frame. The differences between the Frame and Frame Valid tags are:

1) A Frame tag can support much larger objects. A Frame tag can be up to 2 Gbytes away from the instructions to which it refers, while a Frame Valid tag must be within 32 Mbytes of the instructions.

2) A Frame tag can cover a range of up to 16,384 instructions, while a Frame Valid tag can cover only 1024 instructions. Functions with frames that span more instructions may require multiple Frame or Frame Valid tags.

3) A Frame tag requires that all of the registers for which space has been allocated in the save areas be saved. A Frame Valid can specify not only the save area sizes but a subset of the registers that are stored in the save area within the region covered by the tag.

Functions that intersperse saving some non-volatile registers with modifying other non-volatile registers, or which save and modify higher-numbered non-volatile general or floating-point registers before saving lower-numbered registers, need to use "Registers Valid" tags in addition to one or more Frame or Frame Valid tags. A Registers Valid tag specifies a range of addresses for which the tag is valid and 1 bit for each non-volatile general and floating-point register indicating whether it has been saved in the register save area and may not contain its value on entry.

Finally, there is a "Special" tag for functions that establish no frame but use the link register.

Tag Formats

Every tag consists of two word (8 bytes). The low-order 2 bits of the first word of each tag specify the tag type, encoded as shown in Table 1.

TABLE 1

Tag Formats

| Tag Code | Tag Type |
|---|---|
| 0 | Frame |
| 1 | Frame Valid |
| 2 | Registers Valid |
| 3 | Special |

Tables 2–5 specify the formats of each tag type. For the Frame, Frame Valid, and Special tags, BASE refers to the address within the code relative to which offset fields within the tag are computed and on which the tags are sorted. BASE usually refers to the first instruction following the instruction that establishes the frame associated with a Frame or Frame Valid tag. In the case of a Special tag, BASE refers to the first instruction following the instruction that saves the link register. For Frame tags, a RANGE of 0 implies only the establishment of a frame and the sizes of the save areas; subsequent Registers Valid tags supply the register save data.

Special tags apply to leaf functions (i.e., functions that do not call another function) which do not establish a frame but do modify the value in the link register. A Special tag avoids the need for such a leaf function to save into memory (in the caller's LR save word) the value held by the link register upon entry to the function.

The GEN_REGS (FLOAT_REGS) field of a Registers Valid tag permits the tag to indicate that the values, upon function entry, in an arbitrary (i.e., non-contiguous) subset of the general (floating point) non-volatile registers are stored in a stack frame. In any particular virtual address range within a function, perhaps only an arbitrary subset of the non-volatile registers are required (for local variable storage). A Registers Valid tag eliminates the need to save, in the function's stack frame, non-volatile registers that are unchanged since frnction entry, merely in order to save a contiguous set of registers on the frame. In this way, the program's computational efficiency is improved.

TABLE 2

Frame Tag Format

| Word | Bits | Name | Description |
|---|---|---|---|
| 1 | 0–29 | BASE_OFFSET | The (signed) number of words between the tag and the BASE to which it refers, positive if the tag is at a lower address than the BASE. |
| 1 | 30–31 | TYPE | 0 |
| 2 | 0–5 | FRAME_START | The (unsigned, possibly zero) number of words between BASE and the first address at which registers implied by the values FR and GR have been saved. In the interval between that address and BASE, a frame has been established, and the LR save word of the previous frame contains the address from which the function was called, but the non-volatile registers still contain their values when the function was entered. |
| 2 | 6–10 | FR | Size in double words of the floating-point register save area. |
| 2 | 11–15 | GR | Size in words of the general register save area. |
| 2 | 16–29 | RANGE | The (unsigned) number of words between BASE+4*FRAME_START and the last word to which the tag applies. A tag ceases to apply at the instruction after the one that deallocates the frame, and earlier if the register save state changes such that it requires another tag. A RANGE of 0 implies only the establishing of a frame and the sizes of the save areas; subseguent Registers Valid tags supply the register save data. |
| 2 | 30 | C_REG | 1 if and only if the condition register is saved in its assigned place in the register save area. |
| 2 | 31 | LR_INREG | 1 if the link register holds its contents on entry to the function and is not saved in the LR save word of the previous frame. |

TABLE 3

Frame Valid Tag Format

| Word | Bits | Name | Description |
|---|---|---|---|
| 1 | 0–5 | FRAME_START | Same as Frame tag, except that FV and GV specify the number of registers saved. |
| 1 | 6–29 | BASE_OFFSET | Same as Frame tag. |
| 1 | 30–31 | TYPE | 1 |
| 2 | 0–4 | FV | The number of non-volatile floating-point registers saved in the floating-point registers save area within the RANGE of the tag. If a given floating-point register ia saved, so must all others with higher numbers. |
| 2 | 5–9 | FR | Same as Frame tag. |
| 2 | 10–14 | GV | The number bf non-volatile general registers saved in the general registers save area within the RANGE of the tag. If a given register is saved, so must all others with higher numbers |
| 2 | 15–19 | GR | Same as Frame tag. |
| 2 | 20–29 | RANGE | Same as Frame tag. |
| 2 | 30 | C_REG | Same as Frame tag. |
| 2 | 31 | LR_INREG | Same as Frame tag. |

TABLE 4

Registers Valid Tag Format

| Word | Bits | Name | Description |
|---|---|---|---|
| 1 | 0–17 | FLOAT_REGS | One bit for each non-volatile floating-point register, bit 0 for f31, . . . , bit 17 for f14, with a 1 signifying that the register is saved in the register save area. |
| 1 | 18–29 | START_OFFSET | The number of words between the BASE of the nearest preceding Frame or Frame Valid tag and the first instruction to which this tag applies. |
| 1 | 30–31 | TYPE | 2 |
| 2 | 0–17 | GEN_REGS | One bit for each non-volatile general register, bit 0 for r31, . . . , bit 17 for r14, with a 1 signifying that the register is saved in the register save area. |
| 2 | 18–29 | RANGE | The number of words between the first and the last instruction to which this tag applies. |
| 2 | 30 | C_REG | 1 if and only if the condition register is saved in its assigned place in the register save area. |
| 2 | 31 | RESERVED | 0 |

TABLE 5

Special Tag Format

| Word | Bits | Name | Description |
|---|---|---|---|
| 1 | 0–29 | BASE_OFFSET | The (signed) number of words between the tag and the BASE to which it refers, positive if the tag is at a lower address than BASE. |
| 1 | 30–31 | TYPE | 3 |
| 2 | 0–3 | LR_SAVEREG | The (volatile) register that contains the value of the link register at function entry. |
| 2 | 4–19 | RESERVED | 0 |
| 2 | 20–29 | RANGE | The (unsigned) number of words between the first and last word to which the tag applies (zero if the tag applies to only one word). |
| 2 | 30–31 | RESERVED | 0 |

Multiple Tag Sections

As discussed above in the Background section, due to the fact that shared objects are loaded at runtime, as opposed to link time, an executing program may possess two or more on-contiguous groups of tags (or tag sections) at any particular time. These non-contiguous groups of tags are brought into the executable's image in non-deterministic, non-reference, fashion. A dynamic, runtime loader may load an object into the executable's address space on-demand, as reference is made to functions in those objects. While this is efficient in keeping the executable's runtime image small, it makes it harder for an external mechanism, like a debugger, to collect together information about the various tags sections. In order for a debugger to do a stack traceback, it needs to map information about various PC values to their respective tag sections. The invention describes how this information is collected at start up and how it is maintained and updated at runtime. In one embodiment of the present invention, such information is maintained in a doubly-linked list of structures having the following format:

```
struct object_tags {
    struct object_tags *next;   /* Next entry in list */
    struct object_tags *prev;   /* Previous entry in list */
    long firstpc;               /* First virtual address to which the
                                   tag section applies */
    long firsttag;              /* First virtual address at which tags
                                   in the tag section are stored */
    long lastpc;                /* Last virtual address to which the
                                   tag section applies */
    long lasttag;               /* First virtual address beyond the
                                   end of the tag section */
};
```

There is usually one object_tags structure for the primary load object and for each shared object that has been dynamically loaded into the virtual address space of the executing program. The object_tags structure for a particular object indicates, via the firsttag and lasttag fields, the virtual address range over which the object's tag section is stored. In addition, the virtual address range of the instructions to which the object's tag section applies is indicated by the firstpc and lastpc fields of the object's object_tags structure.

In one embodiment, the construction of the object_tags structure for each object (including the appropriate setting of the firstpc, lastpc, firsttag, and lasttag fields) and the insertion of the structure into the doubly-linked list of object_tags structures is achieved in the following manner. Each object, either the primary load object (e.g. an a.out file) or a shared object (e.g. a .so file), is formed by issuing a link command linking two or more separately compiled entities, referred to as modules. A module crti.o, whose contents reflect the pseudo-code immediately below, is inserted in the link command creating the object before any modules containing executable instructions or tags.

```
            .section                        .tags
__tag__start:
            .section                        .object__tags
__object__tags__start:
            .long           0               # next pointer
            .long           0               # prev pointer
            .long           0               # firstpc
            .long           __tag__start    # firsttag
```

Similarly, a module crtn.o, whose contents reflect the pseudo-code immediately below, is appended in the link command creating the shared object (or primary load object) after all of the modules containing executable instructions or tags.

```
            .section                        .tags
__tag__end:
            .section                        .object__tags
            .long           0               # lastpc
            .long __tag__end                # lasttag
__object__tags__end:
```

When the link editor builds the primary load object or a shared object, it concatenates the contributions to each section from the various linked modules in the order they appear in the link command. Therefore, assuming that only the crti.o and crtn.o modules contribute to the .object__tags section, the link editor places the two words in the .object__tags section of the crtn.o module immediately after the four words in .object__tags section of the crti.o module, thereby forming the following complete, six-word object__tags structure in the object's .object__tags section:

```
            .section                        .object__tags
__object__tags__start:
            .long           0               # next pointer
            .long           0               # prev pointer
            .long           0               # firstpc
            .long           __tag__start    # firsttag
            .long           0               # lastpc
            .long           __tag__end      # lasttag
__object__tags__end:
```

Similarly, the link editor will form a combined .tags section consisting of the __tags__start label in the crti.o module followed by the respective tag section contents of each module specified in the link command and finally followed by the __tag__end label in the crtn.o module, as indicated by the following:

```
            .section                        .tags
__tag__start:
        the tags in the tags sections of the modules, other than crti.o and
        crtn.o., specified in the link command used to form the object
__tag__end:
```

The references to the labels __tag__start and __tag__end are resolved when the object is loaded into the program's virtual address space. Thus, the firsttag and lasttag fields of the object__tags structure are set by the dynamic (run-time) loader to the virtual address of the first tag and the virtual address immediately after the last tag, respectively, at this time.

For each module linked to form an object, the compiler produces relocation information for the locations used to store tags for the module. In this way, the compiletime linker can correctly set the base__offset fields of Frame, Frame Valid and Special tags and the start__offset field of Registers Valid tags, during creation of the object.

The use of tags in shared objects is greatly facilitated by storing an offset field in each tag (i.e., the base__offset field of Frame, Frame Valid, and Special tags and the start__offset field of Registers Valid tags) relating the virtual address at which the tag is stored to a virtual address to which the tag applies. In particular, the use of offset fields permits shared objects to be loaded into the respective address spaces of different programs (or even into the address space of one program at different times during execution) at different virtual addresses without having to change the tags in the shared object. The alternative of storing in each tag an explicit virtual address to which the tag applies would require the tag to vary depending on the location at which the shared object containing the tag is loaded, and would therefore prevent sharing a single copy of the tag data.

Before any module is loaded, its initialization section is executed. The initialization section of the crti.o module contains code for setting the firstpc and lastpc fields of the object's objects__tags structure, which as indicated by the above pseudo-code are initialized to zero. This code is executed when the object is loaded into the program's virtual address space. The appropriate setting of the firstpc and lastpc fields is achieved by determining the PC range associated with the first and last tags in the tag section for the object. The addresses at which the first and last tags are stored can be determined from the firsttag and lasttag fields of the relevant object__tags structure, respectively. The discussion, further below, of the flowchart of FIG. 6 describes the calculation of the first and last PC values to which a given tag applies, which values are stored in the variables PCrange__start and PCrange__end, respectively (see steps 605–607, 609, and 611).

After setting the firstpc and lastpc fields, the initialization section executes code for inserting the object__tags structure (whose address is given by the label __object__tag__start) into the doubly-linked list of object__tags structures. This code first examines a pointer, start__list, which points to the start of the doubly-linked list of object__tags structures. If start__list is equal to null (thereby indicating an empty list), then start__list is assigned __object__tags__start. If on the other hand, start__list is not equal to null, then the object__tags structure pointed to by __object__tags__start is inserted into the linked list so that the list remains sorted in increasing order of firstpc values. In this case the code will set one or both of the next and prev pointer fields of the object__tags structure as is necessary to insert the structure at the appropriate location in the list.

When a shared object is removed from the program's address space, the termination section of the crtn.o module is executed. This section contains code for deleting the object__tags structure pointed to by __object__tags__start from the linked list of object__tags structures. The value of the pointer __object__tags__start can be determined in the termination section of this crtn.o module by subtracting 24 from the label __object__tags__end contained in the crtn.o module (i.e., each object__tags structure stores 6 long fields, and thus occupies 24 bytes), thereby avoiding the need for a globally visible but not unique symbol (i.e., __object__tags__start).

Figure 3A:
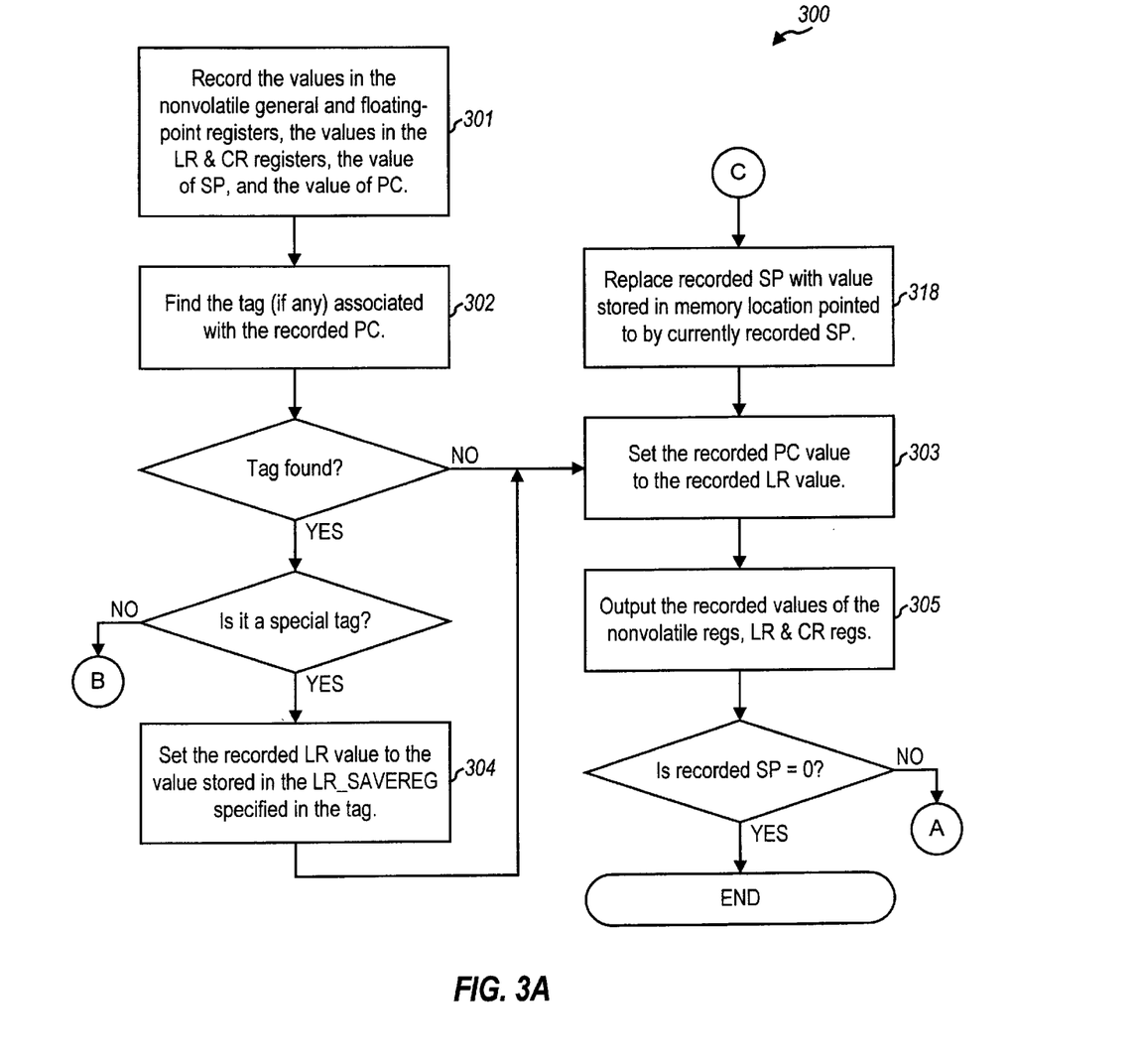
FIGS. 3A–3B depict a flowchart for performing a stack traceback using tags, in accordance with one embodiment of the present invention.
Figure 3B:
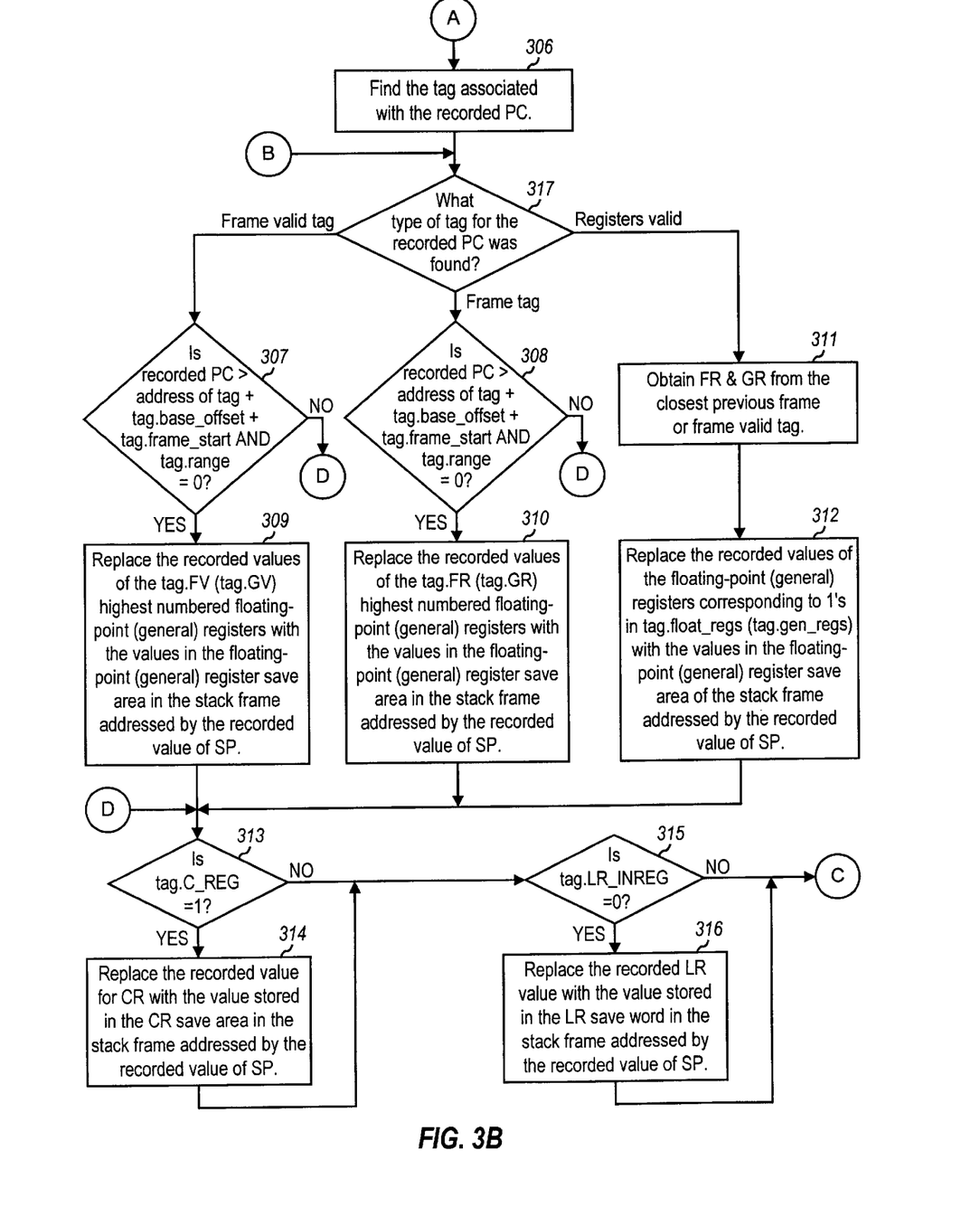

FIGS. 3A–3B present flowcharts for performing a stack traceback, i.e., for reconstructing the values in the non-volatile registers upon entry to each function in the call chain. The depicted stack traceback technique assumes an image of the stack, the current values in the registers, and the virtual address of the next instruction to be executed (PC value). For example, this address could represent a location where a debugging checkpoint is reached or where an exception is generated. The technique creates a snapshot of register values at each function entry, beginning with the latest and working backward through successive call sites in the call chain.

Processing begins in step 301, where the values in the non-volatile general, non-volatile floating-point, LR, and CR registers are recorded. In addition the current values of SP (i.e., value held in register 1, as per System V ABI for PowerPC) and PC value (i.e., next instruction to be executed) are recorded. Next, in step 302, the tag (if any) associated with the recorded PC value is found. If no tag is found in step 302, processing transfers to step 303. If the tag found in step 302 is not a Special tag then processing transfers to decision step 317 (label B). If the tag found in step 302 is a Special tag then processing transfers to step 304. In step 304, the recorded LR value is set to the value stored in the volatile register specified in the LR_SAVEREG field of the Special tag found in step 302. Processing transfers from step 304 to step 303.

In step 303, the recorded PC value is set to the recorded LR value. Processing transfers from step 303 to step 305 where the recorded values of the non-volatile general and floating point registers and of the LR and CR registers are output. These recorded values represent the values held by the corresponding registers upon entry to the current function, which function was called from the address represented by the currently recorded PC value. If the recorded SP is zero then there is no other stack frame to process and thus processing terminates. On the other hand, if the recorded SP is not equal to zero then processing transfers to step 306 (label A). In step 306, the tag associated with the recorded PC value is found.

In decision step 317, the type of tag found in step 306 (or in step 302) is determined. If step 317 determines that a Frame Valid tag was found in step 306 (or 302) then processing transfers to decision step 307, where the recorded PC value is compared against the sum of the byte address of the tag, the base_offset field of the tag, and the frame_start field of the tag. If the recorded PC value is not greater or the range field of the tag is zero then processing transfers to decision step 313. If the range field of a Frame or Frame Valid tag equals zero then the tag only indicates the establishment of a frame and the size of the save areas. No non-volatile registers are saved on the stack frame until the first PC value to which a subsequent Registers Valid tag applies. Otherwise, processing transfers to step 309, where the recorded values of the FV (GV) highest numbered floating-point (general) registers are replaced with the corresponding values in the floating-point (general) register save area in the stack frame addressed by the recorded value of SP (FV and GV denoting the values stored in the tag's FV and GV fields, respectively). Processing transfers from step 309 to decision step 313.

If decision step 317 determines that a Frame tag was found in step 306 (or 302), then in decision step 308 the recorded PC value is compared to the sum of the byte address of the tag, the tag's base_offset field and the tag's frame_start field. If the recorded PC value is not greater or the tag's range field is zero then processing transfers to step 313. Otherwise, processing transfers to step 310, where the recorded values of the FR (GR) highest numbered floating-point (general) registers are replaced with the corresponding values in the floating-point (general) register save area in the stack frame addressed by the recorded value of SP (FR and GR denoting the values stored in the tag's FR and GR fields, respectively). Processing transfers from step 310 to decision step 313.

If decision step 317 determines that a Registers Valid tag was found in step 306 then processing transfers to step 311, where the values in the FR and GR fields of the closest previous (to the found Registers Valid tag) Frame or Frame Valid tag are found. (As follows from the previous discussion of the stack frame format, it is necessary to have FR in order to determine the start address of the general register save area on the stack frame and it is necessary to have both FR and GR in order to determine the start address of the CR save area on the stack frame.) Processing transfers from step 311 to step 312, where the recorded values of the floating-point (general) registers corresponding to set bits in the tag's float_regs (gen_regs) field are replaced with the corresponding values stored in the floating-point (general) register save area in the stack frame addressed by the recorded value of SP. Processing transfers from step 112 to decision step 313.

In step 313, the value stored in the C_REG field of the tag whose type was determined in decision step 317 is examined. If the stored value is not equal to 1 then processing transfers to decision step 315. If the stored value is equal to 1 then processing transfers to step 314, where the recorded value for CR is replaced with the value stored in the CR save area of the stack frame addressed by the recorded value of SP. Processing transfers from step 314 to decision step 315.

In step 315, the value stored in the LR_INREG field of the tag whose type was determined in decision step 317 (or, in the case of a Registers Valid tag, the value stored in the LR_INREG field of the closest previous Frame or Frame Valid tag) is examined. If the value stored in the LR_INREG field is not equal to zero then processing transfers to step 318, described below. If the value stored in the LR_INREG field is equal to zero then processing transfers to step 316, where the recorded LR value is replaced with the value stored in the LR save word in the stack frame addressed by the recorded value of SP. Processing transfers from step 316 to step 318. In step 318, the recorded SP is replaced with the address stored in the memory location pointed to by the currently recorded SP. This updating of the recorded SP pops a frame off the stack i.e., causes the recorded SP to point to the stack frame for the next highest function in the calling sequence. Processing transfers from step 318 to step 303, described above.

Figure 4:
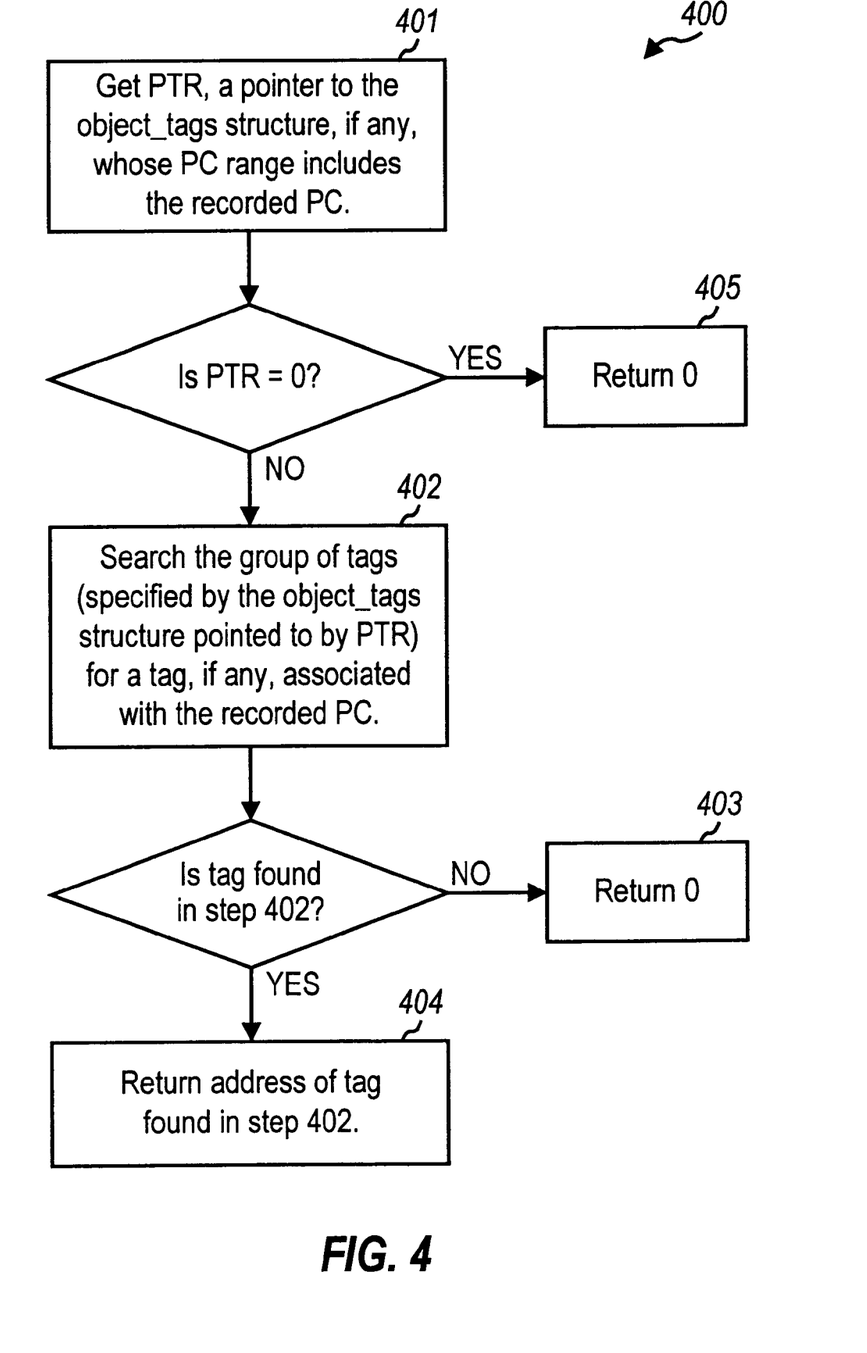
FIG. 4 depicts a flowchart for obtaining the tag associated with a given recorded program counter (PC) value, in accordance with one embodiment of the present invention.

FIG. 4 depicts a flowchart 400 for determining the address of the tag (if any) associated with the recorded PC value. This determination is required for steps 302 and 306 of flowchart 300, depicted in FIGS. 3A–3B. The first step in obtaining the desired address involves obtaining a pointer to the object_tags structure (if any) associated with the recorded PC value, i.e., whose PC range includes the recorded PC value (step 401). If the pointer obtained in step 401 is equal to zero, (which indicates that there is no object_tags structure whose PC range includes the recorded PC value) then the method returns zero for the desired address, thereby indicating that there is no tag associated with the recorded PC value (step 405). On the other hand, if the pointer obtained in step 401 is not equal to zero then the group of tags delineated by the firsttag and lasttag fields of the object_tags structure pointed to by the pointer is searched for a tag (if any) associated with the recorded PC value (step 402). If such a tag is found in step 402, then its address is returned (step 404). Otherwise the value zero is returned, thereby indicating there is no tag associated with the recorded PC value (step 403).

Figure 5:
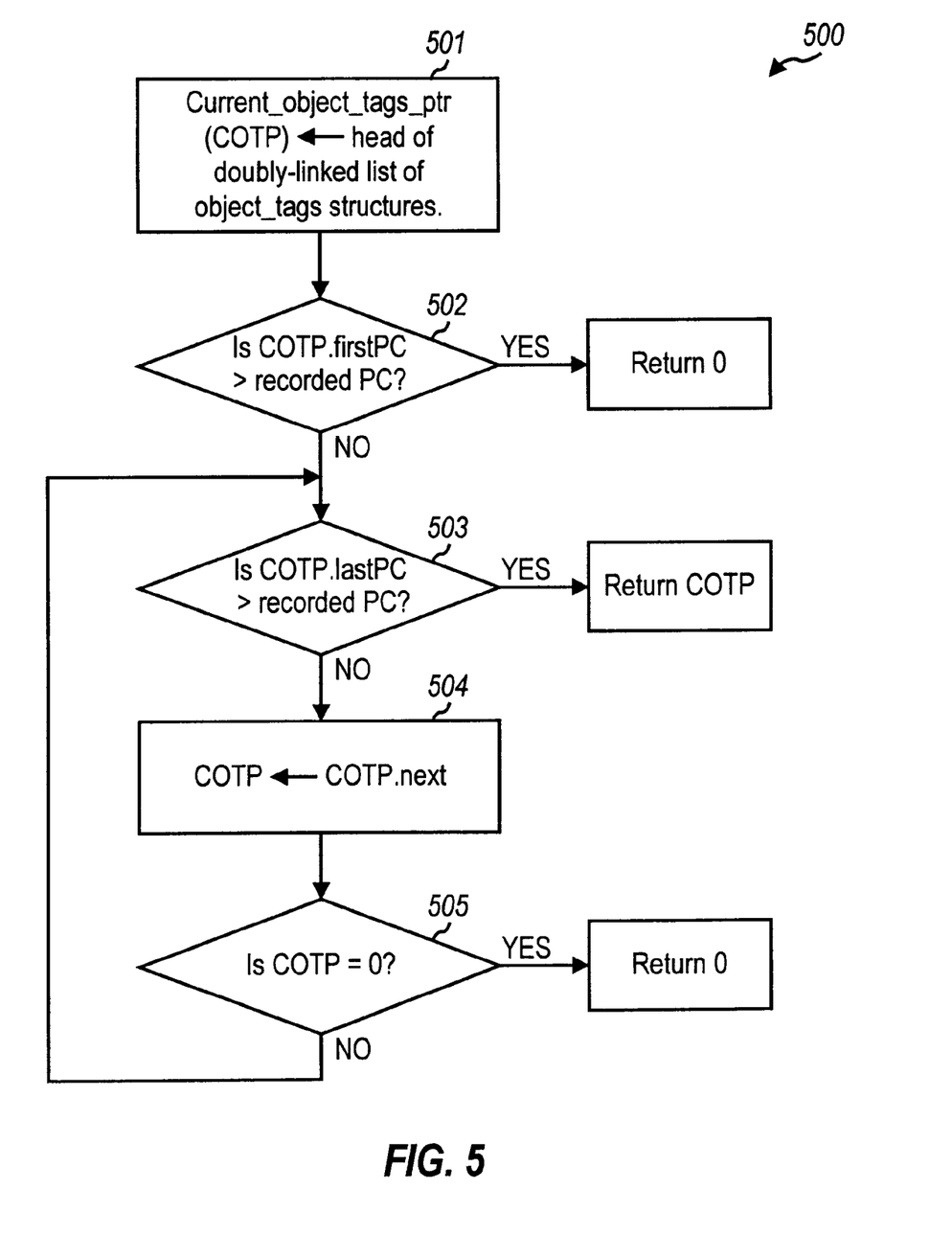
FIG. 5 depicts a flowchart for locating the tag section whose PC range covers a given recorded PC value, in accordance with one embodiment of the present invention.

FIG. 5 depicts a flowchart 500 for carrying out the processing required in step 401 of FIG. 4. The technique of FIG. 5 takes advantage of the fact that the doubly-linked list of object_tags structures is sorted on the firstpc field. In step 501, a pointer current_object_tags_ptr (COTP) is initialized to the head of the doubly-linked list of object_tags structures. In step 502, the value stored in the firstpc field of the object_tags structure pointed to by COTP is compared against the recorded PC value. If the recorded PC value is smaller, then there is no object_tags structure covering the recorded PC value and therefore a value of zero is returned. On the other hand, if the recorded PC value is not smaller, then the lastpc field of the object_tags structure pointed to by COTP is compared against the recorded PC value (step 503). If the recorded PC value is smaller, then the PC range associated with the object_tags structure pointed to by COTP covers the recorded PC value and, thus, the pointer COTP is returned. If the former value is not greater, then the technique advances to the next object_tags structure in the doubly linked list by assigning to COTP the pointer stored in the next field of the object_tags structure pointed to by the pointer currently stored in COTP (step 504). The updated COTP is examined for equality to zero (step 505). If the updated COTP is equal to zero, then the end of the doubly-linked list has been reached and, thus, a value of zero is returned to indicate that there is no object_tags structure whose PC range covers the recorded PC value. If the updated COTP is not equal to zero then processing transfers to step 502, described above.

Figure 6:
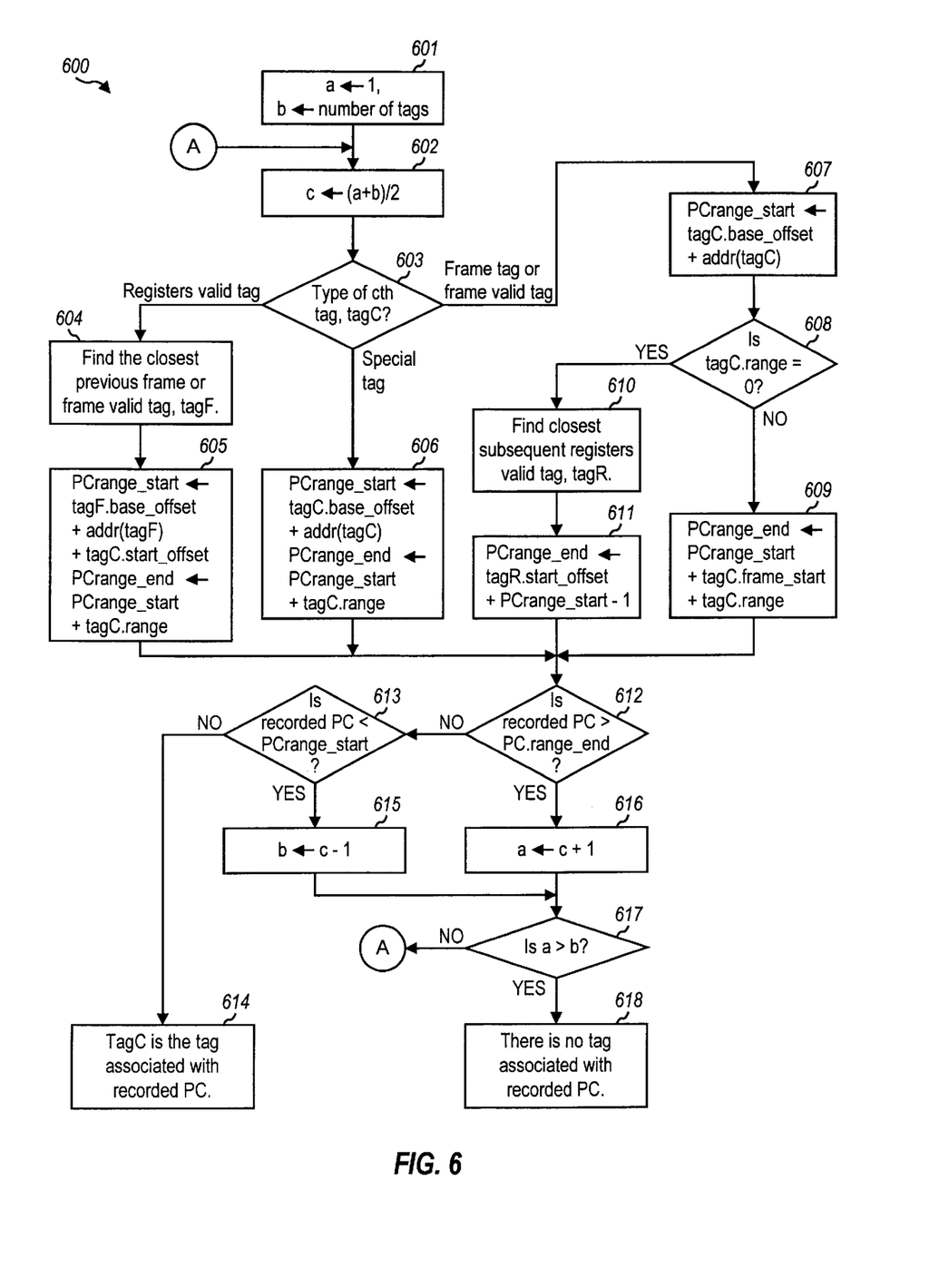
FIG. 6 depicts a flowchart for searching a particular tag section for a tag that applies to a given recorded PC value, in accordance with one embodiment of the present invention.

FIG. 6 depicts a flowchart 600 for carrying out the processing required in step 402 of FIG. 4. In particular, the technique of FIG. 6 uses a binary search to search the group of tags (i.e., tag section) associated with a particular object_tags structure (i.e., the structure pointed to by the pointer, PTR, obtained in step 401 of FIG. 4) for a tag whose associated PC range covers the recorded PC value. A binary search is possible because the tags within any particular tag section are sorted on their associated PC ranges. In step 601, a variable a is initialized to 1 and a variable b is initialized to the number of tags in the tags section associated with the object_tags structure pointed to by PTR. This number can be easily determined from the difference between the values stored in the firsttag and lasttag fields, respectively, of the particular object_tags structure, given that tags are of uniform length (i.e., two words). During each iteration of the binary search, the variables a and b denote the lower and upper ends, respectively, of the subrange of the tag section that still needs to be searched. The approximate midpoint of this range is computed and saved in a variable c (step 602). During the iteration, the cth tag, tagc, is examined to see if its associated PC range covers the recorded PC value. In particular, the highest and lowest PC value (i.e., virtual address) to which tagc applies (PCrange_end and PCrange_start) are computed.

If the recorded PC value lies between PCrange_start and PCrange_end then tagc is the tag associated with the recorded PC value and the binary search terminates (steps 612–614). If, on the other hand, the recorded PC value is greater than (less than) the value for PCrange_end (PCrange_start) then the binary search is restricted to the upper (lower) half of the current tag subrange by setting a (b) to the value of c plus (minus) one in step 616 (step 615). After the tag subrange to be searched has been updated as indicated above, the lower end of the subrange, a is compared with the upper end of the subrange, b (step 617). If a is greater than b then the binary search is complete and there is no tag associated with the recorded PC value (step 618). Otherwise, another iteration of the binary search proceeds, commencing with the recomputation of c in step 602, as described above.

Given that the computation of PCrange_start and Pcrange_end varies with tag type, during each iteration the type of tagc is determined (step 603) after the value of c is determined for the iteration (step 602). If tagc is a Registers Valid tag, then the closest previous Frame or Frame Valid tag (tagF) is found (step 604). Next, in step 605 PCrange_start is computed as the sum of the value stored in the base_offset field of tagF, the address of tagF and the value stored in the start_offset field of tagc. In addition, PCrange_end is computed as the sum of PCrange_start and the value stored in the range field of tagc. If, on the other hand, tagc is a Special tag, then in step 606 PCrange_start is computed as the sum of the value stored in the base_offset field of tagc and the address of tagc. PCrange_end is computed as the sum of PCrange_start and the value stored in the range field of tagc.

Finally, if tagc is either a Frame or Frame Valid tag then PCrange_start is computed as the sum of the value stored in the base_offset field of tagc and the address of tagc (step 607). The computation of PCrange_end for a Frame or Frame Valid tag is performed in one of two ways, depending on whether or not the value stored in the range field of the tag is zero. If the stored range value is not zero, then Pcrange_end is computed as the sum of PCrange_start, the value stored in the frame_start field of tagc and the value stored in the range field of tagc (step 609). On the other hand, if the stored range value is zero, then the closest subsequent Registers Valid tag (tagR) is found (step 610). In this case, Pcrange_end is computed as the sum of the value stored in the start_offset field of tagR and PCrange_start minus 1 (step 611).

Using Tags to Store Other Types of Object Data

In alternative embodiments, the crti.o and crtn.o modules, as described above, could be adapted to create, inside each object in an executing program, a structure that stores a first address range over which a set of data (other than information regarding non-volatile registers) for the object is stored and a second address range to which the set of data applies. As in the discussed embodiment, such a structure would be inserted into a linked list of structures when the object containing the structure is loaded into the program's address space.

In some such embodiments a tag could specify a virtual address range (perhaps, indirectly via offset fields, in order to maintain load address independence for the tag contents, as described above) and a source code entity corresponding to the virtual address range. Such a source code entity might be a particular source code line, a particular indivisible block of source code (i.e. a block always executed as a unit such as the body of an IF statement), or a particular function.

For example, in one embodiment each tag might specify a virtual address range and the function associated with the virtual address range. Such tags could, for instance, enable a profiling tool to compile statistics regarding the respective frequencies of execution of the various functions comprising a program. Periodically during program execution (perhaps on each timer interrupt), the profiler would locate the tag (and hence determine the function) corresponding to the virtual address of the currently executing instruction. The function frequency information might be used by programmers to determine the functions to which their optimization efforts should be applied. In an interpretive environment supporting just-in-time compilation, the function frequency information could be used to determine which functions should be compiled (as opposed to interpreted upon each invocation) for reasons of efficiency.

In order to determine the source code entity corresponding to a particular virtual address, the tool requiring this information (e.g. profiler) could search the linked list of object_tags structures to find the object_tags structure that applies to the particular virtual address (for example, as shown in FIG. 5). Then, a binary search could be performed on the tag section pointed to by the object_tag structure, in order to find the tag (and hence determine the source code entity) corresponding to the particular virtual address. A binary search similar (but perhaps simpler, since there might be only one type of tag and hence only one way to calculate PCrange_start and PCrange_end for a tag) to that depicted in FIG. 6 could be used.

The invention has now been explained with reference to specific embodiments. Other embodiments will be apparent to those of ordinary skill in the art in view of the foregoing description. For concreteness, the invention has been described herein in conjunction with the System V Application Binary Interface (ABI). However, the invention is equally applicable to any environment in which, by convention, certain registers are non-volatile. It is therefore not intended that this invention be limited except as indicated by the appended claims and their full scope of equivalents.

What is claimed is:

1. A computer-implemented method for locating information that applies to a particular address in a program comprising:

locating a particular set of data that applies to a particular object, the particular object being either a primary object or a shared object that is loaded into an address space during execution of the program, each object includes a set of compiled instructions and occupies a respective address range;

determining a particular address range to which the particular set of data applies;

determining whether the particular address range includes the particular address; and if the particular address range includes the particular address, searching the particular set of data for the information that applies to the particular address.

2. The method of claim 1, wherein the information that applies to the particular address indicates that the particular address corresponds to a particular line of source code for the program.

3. The method of claim 1, wherein the information that applies to the particular address indicates that the particular address corresponds to a particular block of source code for the program.

4. The method of claim 1, wherein the information that applies to the particular address indicates that the particular address corresponds to a particular function of the program.

5. The method of claim 1, wherein each set of data is independent of the address space of the object to which the set of data applies.

6. The method of claim 1 wherein the step of locating a particular set of data includes:

searching a linked list of structures, wherein each structure in the linked list is associated with a respective primary or shared object and is inserted into the linked list when the respective object is loaded into the address space, each structure stores information describing the set of data of the respective object, the information including the particular address range to which the set of data applies, and a second address range over which the set of data is stored;

for a particular structure, determining whether the particular address range stored in the particular structure includes the particular address; and using the second address range stored in the particular structure to locate the particular set of data.

7. The method of claim 1 wherein the step of locating a particular set of data includes locating a particular tag section that defines the particular set of data, the particular tag section includes one or more tags, each of the tags applies to a respective address range that is within the particular address range to which the particular set of data applies; and the step of searching the particular set of data includes locating a particular tag in the particular tag section, and determining whether the address range to which the particular tag applies includes the particular address, the particular tag indicating that one or more of the values are stored in a stack frame for a function of the program when the program is executing within the particular address range to which the particular tag applies.

8. The method of claim 7, wherein all of the tags in each tag section are independent of the address at which the object including the tag section is loaded.

9. A computer program product for locating information that applies to a particular address in a program comprising:

code for locating a particular set of data that applies to a particular object, the particular object being either a primary object or a shared object that is loaded into an address space during execution of the program, each object includes a set of compiled instructions and occupies a respective address range;

code for determining a particular address range to which the particular set of data applies;

code for determining whether the particular address range includes the particular address;

code for searching, if the particular address range includes the particular address, the particular set of data for the information that applies to the particular address; and a computer-readable storage medium that stores the codes.

10. The product of claim 9, wherein each set of data is independent of the address space of the object to which the set of data applies.

11. The product of claim 9 wherein the code for locating a particular set of data includes:

code for searching a linked list of structures, wherein each structure in the linked list is associated with a respective primary or shared object and is inserted into the linked list when the respective objects is loaded into the address space, each structure stores information describing the set of data of the respective object, the information including the particular address range to which the set of data applies, and a second address range over which the set of data is stored;

code for determining, for a particular structure, whether the particular address range stored in the particular structure includes the particular address; and code for using the second address range stored in the particular structure to locate the particular set of data.

12. The product of claim 9 wherein the code for locating a particular set of data includes code for locating a particular tag section that defines the particular set of data, the particular tag section includes one or more tags, each of the tags applies to a respective address range that is within the particular address range to which the particular set of data applies; and the code for searching the particular set of data includes
code for locating a particular tag in the particular tag section, and
code for determining whether the address range to which the particular tag applies includes the particular address, the particular tag indicating that one or more of the values are stored in a stack frame for a function of the program when the program is executing within the particular address range to which the particular tag applies.

13. The product of claim 12, wherein all of the tags in each tag section are independent of the address at which the object including the tag section is loaded.

14. A method for retrieving, when execution of a program reaches a particular address, values of one or more non-volatile registers stored, upon entry into a function, in a stack frame, the method comprising:

locating a particular tag, the particular tag indicates that values of a non-contiguous subset of the registers, upon entry to the function, are stored in the stack frame for the function, the particular tag further indicates a particular address range to which the particular tag applies;

determining whether the particular address range includes the particular address of program execution; and retrieving the values of the non-contiguous subset of the registers in the stack frame for the function.

15. The method of claim 14, wherein:

the particular tag contains a respective bit for each of the registers; and for each register, the bit for the register indicates if the value of the register is stored, upon entry to the function, in the stack frame for the function.

16. A computer program product for retrieving, when execution of a program reaches a particular address, values of one or more non-volatile registers stored, upon entry into a function, in a stack frame, the product comprising:

code for locating a particular tag, the particular tag indicates that values of a non-contiguous subset of the registers upon entry to the function are stored in the stack frame for the function, the particular tag further indicates a particular address range to which the particular tag applies;

code for determining whether the particular address range includes the particular address of program execution;

code for retrieving the values of the non-contiguous subset of the registers in the stack frame for the function; and a computer-readable storage medium that stores the codes.

17. The product of claim 16, wherein:

the particular tag contains a respective bit for each of the registers; and for each register, the bit for the register indicates if the value of the register is stored, upon entry to the function, in the stack frame for the function.

18. A method for retrieving a value of a particular register when execution of a program reaches a particular address within a function, the method comprising:

locating a tag that indicates that values of registers are stored when the program is executing within an address range, the tag further indicates a particular address range to which the tag applies;

determining whether the particular address range includes the particular address within the function; and retrieving the value of the particular register.

19. A computer program product for retrieving a value of a particular register when execution of a program reaches a particular address within a function, the product comprising:

code for locating a tag that indicates that values of registers are stored when the program is executing within an address range, the tag further indicates a particular address range to which the tag applies;

code for determining whether the particular address range includes the particular address within the function;

code for retrieving the value of the particular register; and a computer-readable storage medium that stores the codes.

20. A computer-implemented method for reconstructing one or more sets of values, each set of values corresponding to a function in a function call chain, the method comprises:

locating a set of data;

determining a particular address range to which the set of data applies;

determining whether a particular program address of a particular function in the function call chain is within the particular address range;

retrieving the set of values within the set of data; and repeating the locating, both determining, and the retrieving for all functions in the function call chain.

21. The method of claim 20, wherein:

each set of data is a tag, and each tag is implemented using a linked list structure.

22. The method of claim 21, wherein:

the linked list structures are sorted based on their associated program addresses.

23. The method of claim 20, wherein:

the set of values is representative of content of registers that have been saved.

* * * * *